(12) United States Patent
Wang et al.

(10) Patent No.: US 8,582,067 B2
(45) Date of Patent: Nov. 12, 2013

(54) ARRAY SUBSTRATE, LIQUID CRYSTAL PANEL, LIQUID CRYSTAL DISPLAY AND DRIVING METHOD THEREOF

(75) Inventors: Zheng Wang, Beijing (CN); Xibin Shao, Beijing (CN)

(73) Assignees: Boe Technology Group Co., Ltd., Beijing (CN); Beijing Boe Display Technology Co., Ltd., Beijing (CN)

( * ) Notice: Subject to any disclaimer, the term of this patent is extended or adjusted under 35 U.S.C. 154(b) by 123 days.

(21) Appl. No.: 13/157,775

(22) Filed: Jun. 10, 2011

(65) Prior Publication Data
US 2011/0304787 A1    Dec. 15, 2011

(30) Foreign Application Priority Data
Jun. 13, 2010  (CN) .......................... 2010 1 0208434

(51) Int. Cl.
*G02F 1/1343* (2006.01)

(52) U.S. Cl.
USPC ........................................... 349/141; 349/33

(58) Field of Classification Search
None
See application file for complete search history.

(56) References Cited

U.S. PATENT DOCUMENTS

| | | | |
|---|---|---|---|
| 2001/0019372 A1* | 9/2001 | Ootsu et al. | 349/38 |
| 2002/0067453 A1* | 6/2002 | Kim et al. | 349/141 |
| 2002/0109801 A1* | 8/2002 | Ono et al. | 349/43 |
| 2003/0202142 A1* | 10/2003 | Ishii et al. | 349/122 |
| 2004/0085503 A1* | 5/2004 | Kim et al. | 349/141 |
| 2004/0109122 A1* | 6/2004 | Kumagawa et al. | 349/143 |
| 2007/0222907 A1* | 9/2007 | Onogi et al. | 349/42 |
| 2008/0100766 A1* | 5/2008 | Ming et al. | 349/44 |
| 2009/0262061 A1* | 10/2009 | Chung et al. | 345/100 |
| 2010/0245224 A1* | 9/2010 | Xu et al. | 345/98 |

FOREIGN PATENT DOCUMENTS

JP     2007-264080 A  * 10/2007

* cited by examiner

*Primary Examiner* — Mike Stahl
(74) *Attorney, Agent, or Firm* — Ladas & Parry LLP

(57) ABSTRACT

An array substrate is provided. The array substrate comprises a base substrate, a plurality of pixel units are provided on the base substrate in a matrix form, a common electrode and a pixel electrode are provided in each of the pixel units, the common electrode is connected with a common electrode line and the pixel electrode is connected with a data line through a switching element. The pixel units in the matrix form comprise a first pixel unit and a second pixel unit. When polarities of voltage difference between the pixel electrode and the common electrode in the first pixel unit is identical to that in the second pixel unit, the direction of an electric field formed between the pixel electrode and the common electrode and for driving liquid crystal molecules to display at a gray level in the first pixel unit is opposite to that in the second pixel unit.

5 Claims, 15 Drawing Sheets

U.S. Serial No. 13/157,775
Replacement Sheet 1

| First Pixel Unit | Second Pixel Unit | First Pixel Unit | Second Pixel Unit |
|---|---|---|---|
| First Pixel Unit | Second Pixel Unit | First Pixel Unit | Second Pixel Unit |
| First Pixel Unit | Second Pixel Unit | First Pixel Unit | Second Pixel Unit |
| First Pixel Unit | Second Pixel Unit | First Pixel Unit | Second Pixel Unit |

Fig.4B

ARRAY SUBSTRATE, LIQUID CRYSTAL PANEL, LIQUID CRYSTAL DISPLAY AND DRIVING METHOD THEREOF

BACKGROUND

Embodiments of the present invention relate to an array substrate, a liquid crystal panel, a liquid crystal display and a driving method thereof.

At present, liquid crystal displays (LCDs) are the most popular flat panel displays, and thin film transistor liquid crystal displays (TFT-LCDs) dominate the market of LCDs. According to the direction of applied electric field, LCDs can be classified into a vertical electric field type LCD, such as twisted nematic (TN) type LCD, and a horizontal electric field type LCD, such as in-plane switching (IPS) type LCD and fringe field switching (FFS) type LCD.

In various types of LCDs, liquid crystal molecules rotate under driving of applied electric field so that light selectively transmits through the layer of the liquid crystal molecules to display at a gray level. The above-mentioned electric field for driving liquid crystal molecules is formed between a pixel electrode and a common electrode. Typically, the common voltage applied to the common electrode keeps constant and the voltage applied to the pixel electrode is controlled by driving signal sequences, so that the electric field formed between the pixel electrode and the common electrode can be changed.

Coupling phenomenon occurs between adjacent pixel units when the electric fields in the adjacent pixel units have the same polarity. In order to decrease the adverse influence of such coupling phenomenon on the display quality, a reverse drive technology is proposed. In the reverse drive technology, the electric fields in the pixel units are alternately reversed by appropriate driving signal sequences between frames of an image, so that the rotation direction of the liquid crystal molecule is alternately changed. For example, the common voltage of the common electrode is set as +6 V and the voltage of the pixel electrode is changed in the range of 0~+12 V, so that the alternately-reversed electric field can be achieved. With the reverse drive technology, a frame-reverse mode, a row-reverse mode, a column-reverse mode or a point-reverse mode can be achieved. Point-reverse mode is preferred by the manufacturers due to its uniform display image, high image quality and small coupling between adjacent pixel units.

SUMMARY

According to an aspect of the invention, an array substrate is provided. The array substrate comprises a base substrate, and a plurality of pixel units being provided on the base substrate in a matrix form, a common electrode and a pixel electrode being provided in each of the pixel units, the common electrode being connected with a common electrode line and the pixel electrode being connected with a data line through a switching element, wherein the pixel units in the matrix form comprise first pixel units and second pixel units; when polarity of voltage difference between the pixel electrode and the common electrode in one first pixel unit is identical to that in one second pixel unit, the direction of an electric field formed between the pixel electrode and the common electrode and for driving liquid crystal molecules to display at a gray level in the first pixel unit is opposite to that in the second pixel unit.

According to another aspect of the invention, a liquid crystal panel is provided. The liquid crystal panel comprises the above-described array substrate, a color filter substrate and a liquid crystal layer filled between the array substrate and the color filter substrate.

According to still another aspect of the invention, a liquid crystal panel is provided. The liquid crystal panel comprises an array substrate; a color filter substrate; a plurality of pixel units being correspondingly provided on both of the array substrate and the color filter substrate, a common electrode and a pixel electrode being provided in each of the pixel units, the common electrode being connected with a common electrode line and the pixel electrode being connected with a data line through a switching element, wherein the pixel electrode and the common electrode in each pixel unit are respectively provided on the array substrate and the color filter substrate; the pixel units in the matrix form comprise first pixel units and second pixel units; when polarity of voltage difference between the pixel electrode and the common electrode in one first pixel unit is identical to that in one second pixel unit, the direction of an electric field formed between the pixel electrode and the common electrode and for driving liquid crystal molecules to display at a gray level in the first pixel unit is opposite to that in the second pixel unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIG. 4B is a schematic view showing another layout of the array substrate according to the first embodiment of the invention;

DETAILED DESCRIPTION

Figure 1A:
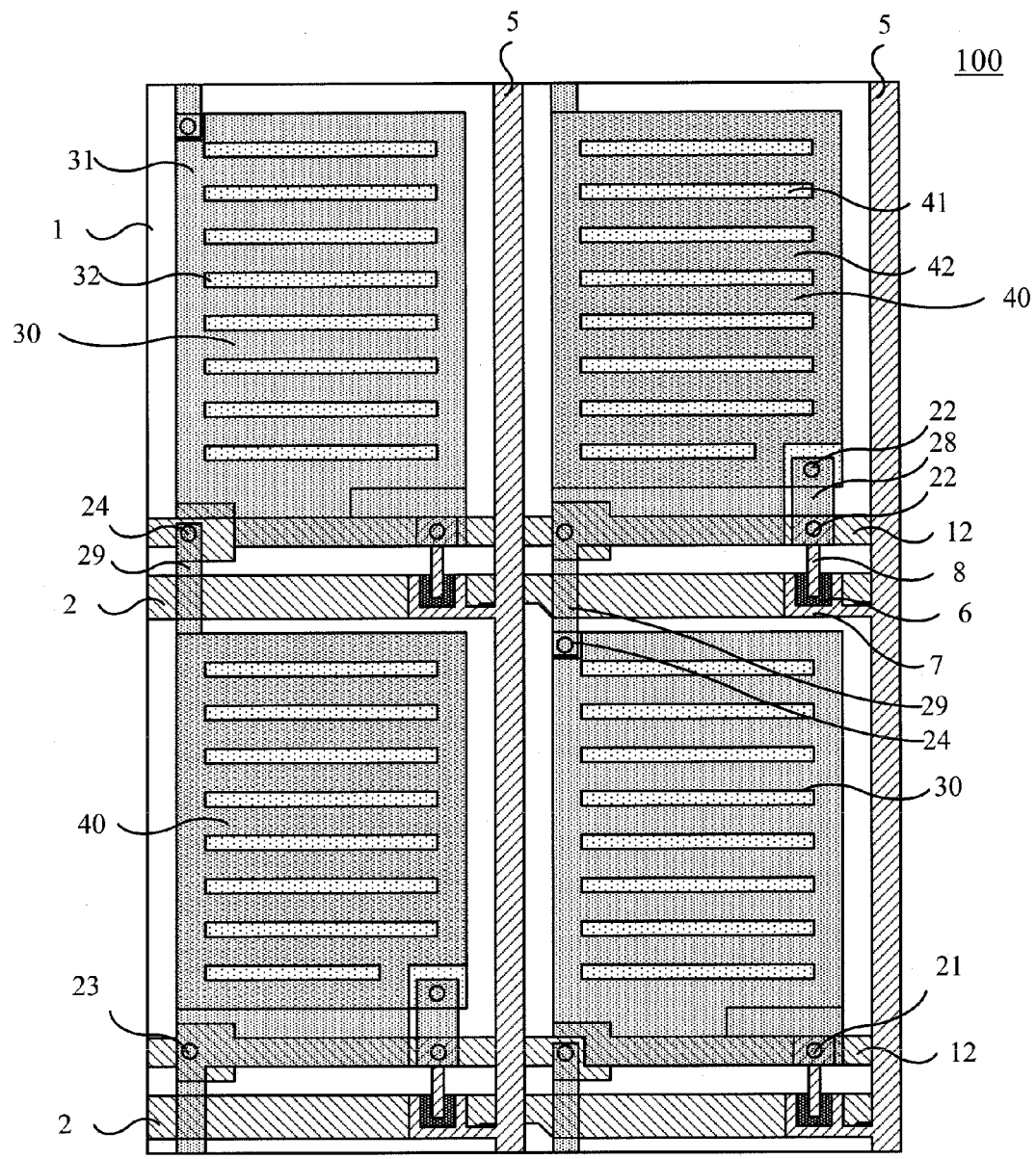
FIG. 1A is a top view showing an array substrate according to a first embodiment of the invention.

Hereinafter, the embodiments of the invention will be described in detail with reference to the accompanying drawings so that the objects, technical solutions and advantages of the embodiments of the invention will become more apparent. It should be noted that the embodiments described below merely are a portion of but not all of the embodiments of the invention, and thus various modifications, combinations and alterations may be made on basis of the described embodiments without departing from the spirit and scope of the invention.

The basic working principle of a LCD is that: the rotation direction of liquid crystal molecules is controlled by applied electric field so that light selectively transmits through the layer of the liquid crystal molecules to display at a gray level. A liquid crystal panel of a LCD comprises an array substrate, a color filter substrate and a layer of liquid crystal molecules interposed between the array substrate and the color filter substrate. A plurality of pixel units are formed in the liquid crystal panel in a matrix form. In each of the pixel units, the electric field for driving liquid crystal molecules is formed when voltages are applied to the pixel electrode and the common electrode of the pixel unit. The direction of the electric field is determined by the polarity of voltage difference applied over the pixel electrode and the common electrode in the pixel unit. For example, when the voltage (which is applied to the pixel electrode) is larger than the common voltage (which is applied to the common electrode), the voltage is denoted as a positive voltage, the common voltage is denoted as a negative voltage, and in this case, the direction of the electric field is directed from the positive voltage to the negative voltage (that is, from the pixel electrode to the common electrode). On the other hand, for example, when the voltage is smaller than the common voltage, the voltage is denoted as a negative voltage, the common voltage is denoted as a positive voltage, and in this case, the direction of the electric field is directed from the positive voltage to the negative voltage (that is, from the common electrode to the pixel electrode).

In each of the pixel units, the directions of the electric fields at different positions may be identical to or different from one another. For example, in each pixel unit of a TN type LCD in which the pixel electrode and the common electrode are respectively provided on the array substrate and the color filter substrate, the direction of the electric field for driving liquid crystal molecules to display at a gray level at different positions are identical to one another. It should be noted that, the phrase of "electric field for driving liquid crystal molecules to display at a gray level" means an electric field for driving the liquid crystal molecules to obtain a desired gray level and do not comprise an electric field which has an adverse influence on realizing of the desired gray level. In a horizontal electric field type LCD, the horizontal electric field for driving liquid crystal molecules to display at a gray level is merely formed at some positions in a pixel unit, and a fringe vertical electric field is formed at other positions. The fringe vertical electric field has an adverse influence on realizing of the desired gray level, and such adverse influence generally is small and can be ignored. Thus, the fringe vertical field is not included in the electric field for driving liquid crystal molecules to display at a gray level. In an FFS type LCD, for one pixel unit, the pixel electrode and the common electrode are provided on the same array substrate in different layers; the directions of the horizontal electric fields at different positions in each pixel unit are different from one another; however, at corresponding positions of pixel units, the directions of the horizontal electric fields for driving liquid crystal molecules to display at a gray level are identical to one another. In an IPS type LCD, for one pixel unit, the pixel electrode and the common electrode are provided on the same array substrate in a same layer, both of the pixel electrode and the common electrode have a comb-like shape with slits, and the pixel electrode and the common electrode are interdigitated with each other; the directions of the electric fields at different positions in each pixel unit are different from one another; however, at corresponding positions of pixel units, the directions of the horizontal electric field for driving liquid crystal molecules to display at a gray level are identical to one another.

According to embodiments of the invention, when the polarities of voltage difference between the pixel electrode and the common electrode are the same in pixel units, the state in which the directions of the electric fields for driving liquid crystal molecules to display at a gray level are identical to one another at corresponding positions of the respective pixel units is changed to the state in which the electric fields for driving liquid crystal molecules to display at a gray level have opposite directions at the corresponding positions of the respective pixel units.

The embodiments can be applied to a horizontal electric field type LCD having wide view angle.

According to an embodiment of the invention, an array substrate is provided. The array substrate comprises a base substrate. A plurality of pixel units are provided on the base substrate in a matrix form. In each of the pixel units, a common electrode and a pixel electrode are provided, both the common electrode and the pixel electrode are formed on the base substrate, the common electrode is connected with a common electrode line, and the pixel electrode is connected with a data line through a switching element. The pixel units in the matrix form comprise a first pixel unit and a second pixel unit. When the polarity of voltage difference between the pixel electrode and the common electrode in one first pixel unit is identical to that in one second pixel unit, the direction of the electric field formed between the pixel electrode and the common electrode and for driving liquid crystal molecules to display at a gray level in the first pixel unit is opposite to that in the second pixel unit.

Further, the above-described array substrate can be used to achieve the horizontal electric field type LCD in cooperation with a color filter substrate.

The embodiments of the invention can be applied to a vertical electric field type LCD as well.

According to another embodiment of the invention, a liquid crystal panel is provided. The liquid crystal panel comprises an array substrate and a color filter substrate. A plurality of pixel units are correspondingly formed on both of the array substrate and the color filter substrate in a matrix form. In each of the pixel units, a common electrode and a pixel electrode are provided, the common electrode and the pixel electrode are respectively provided on the array substrate and the color filter substrate, the common electrode is connected with a common electrode line, and the pixel electrode is connected with a data line through a switching element. The pixel units in the matrix form comprise a first pixel unit and a second pixel unit. When the polarity of voltage difference between the pixel electrode and the common electrode in one first pixel unit is identical to that in one second pixel unit, the direction of the electric field formed between the pixel electrode and the common electrode and for driving liquid crystal molecules to display at a gray level in the first pixel unit is opposite to that in the second pixel unit.

In the following description, for the purpose of clarity, the pixel electrode and the common electrode in the first pixel unit is referred to as a first pixel electrode and a first common electrode, and the pixel electrode and the common electrode in the second pixel unit is referred to as a second pixel electrode and a second common electrode.

According to the embodiments of the invention, pixel units of two types can be formed. Even when the polarities of voltage difference between the common electrode and the pixel electrode are the same among the respective pixel units, the electric fields for driving liquid crystal molecules to display at a gray level can have opposite directions at corresponding positions of the respective pixel units due to the structural difference of the pixel units.

According to the embodiments of the invention, with structural design, the electric fields for driving liquid crystal molecules to display at a gray level can have opposite directions among pixel units. Thus, the directions of the electric fields can be alternately changed without reversing driving signal sequences. In this way, the parasitic capacitance can be decreased, the driving signal sequences can be simplified, the coupling phenomenon between adjacent pixel units can be alleviated, and the crosstalk due to the coupling phenomenon can be deceased so that the image quality can be improved. Therefore, with the embodiments of the invention, the display quality of the LCD thus obtained can be improved while power consumption can be kept to a low level. In addition, when cooperating with the reverse of the driving signal sequences, the embodiments of the invention can achieve complex reverse driving technologies with relatively small power consumption.

The embodiments of the invention can be applied to LCDs of many types, such as horizontal electric field type LCDs (e.g., an IPS type or FFS type LCD) and the vertical electric field type LCD (e.g., TN type LCD). Hereinafter, the embodiments of the invention will be described in detail.

First Embodiment

FIG. 1A is a top view showing an array substrate according to a first embodiment of the invention. The array substrate 100 comprises a base substrate 1. A plurality of pixel units are provided on the base substrate 1 in a matrix form. In each of the pixel units, a common electrode 32 or 42 and a pixel electrode 31 or 41 are provided; the common electrode 32 or 42 is connected with a common electrode line 12, and the pixel electrode 31 or 41 is connected with a data line 5 through a switching element. The pixel units in the matrix form comprise first pixel units 30 and second pixel units 40. When the polarity of voltage difference between the pixel electrode and the common electrode in one first pixel units 30 is identical to that in one second pixel units 40, the direction of the electric field formed between the pixel electrode and the common electrode and for driving liquid crystal molecules to display at a gray level in the first pixel unit 30 is opposite to that in the second pixel unit 40.

This embodiment relates to an FFS type array substrate. In each of the pixel units, the common electrode and the pixel electrode are provided on the base substrate 1 in different layers. In each first pixel unit 30, the pixel electrode 31 is provided further from the base substrate 1 than the common electrode 32. In each second pixel unit 40, the common electrode 41 is provided further from the base substrate 1 than the pixel electrode 42. However, the embodiment is not limited to the above structure, and the common electrodes and the pixel electrodes in the first and second pixel units can be reversely provided. In each pixel unit, the one, provided further from the base substrate 1, of the common electrode and the pixel electrode has slits formed therein, and the slits are parallel to one another. The one, provided nearer to the base substrate 1, of the common electrode and the pixel electrode has a block shape without slits.

As shown in FIG. 1, the first pixel electrode 31 is provided above the first common electrode 32 in each first pixel unit 30, and the second common electrode 42 is provided above the second pixel electrode 41 in each second pixel unit 40.

In addition, the FFS type array substrate 100 further comprises data lines 5 and gate lines 2 intersecting with one another to define pixel units. The switching element in each pixel unit for example is a thin film transistor (TFT), which comprises a gate electrode, an active layer island 6, a source electrode 7 and a drain electrode 8. The gate electrode is connected one the gate line 2 or is a part of the gate line 2. The source electrode 7 is connected with one data line 5. The drain electrode 8 is connected with the pixel electrode 31 or 41 of the pixel unit. The opposing ends of the source electrode 7 and the drain electrode 8 are overlapped with the gate electrode and separated from each other by the active layer island 6, and thus the thin film transistor is configured. The thin film transistor is turned on or off by the voltage applied on the gate electrode through the gate line 2. The drain electrode 8 of the transistor is connected with corresponding pixel electrode through an insulating layer via hole. The common electrode is connected with the common electrode line 12. The common electrode and the common electrode line 12 may be provided in the same layer or in adjacent layers to directly connect with each other, or may be provided in different layers to connect with each other through an insulating layer via hole. The common electrode line 12 can be further used as a blocking bar, and the overlapping portion of the common electrode line 12 and the pixel electrode forms a storage capacitor.

The array substrate in this embodiment can be manufactured by using the conventional layer configuration of a data line, a gate line, a common electrode line and a switch element on an array substrate to avoid the increase of the numbers of the patterning processes, and thus the manufacture cost would not be increased.

In this embodiment, in the direction from the base substrate 1 to the surface away from the base substrate 1, the respective layers are provided as follows.

Figure 2A:
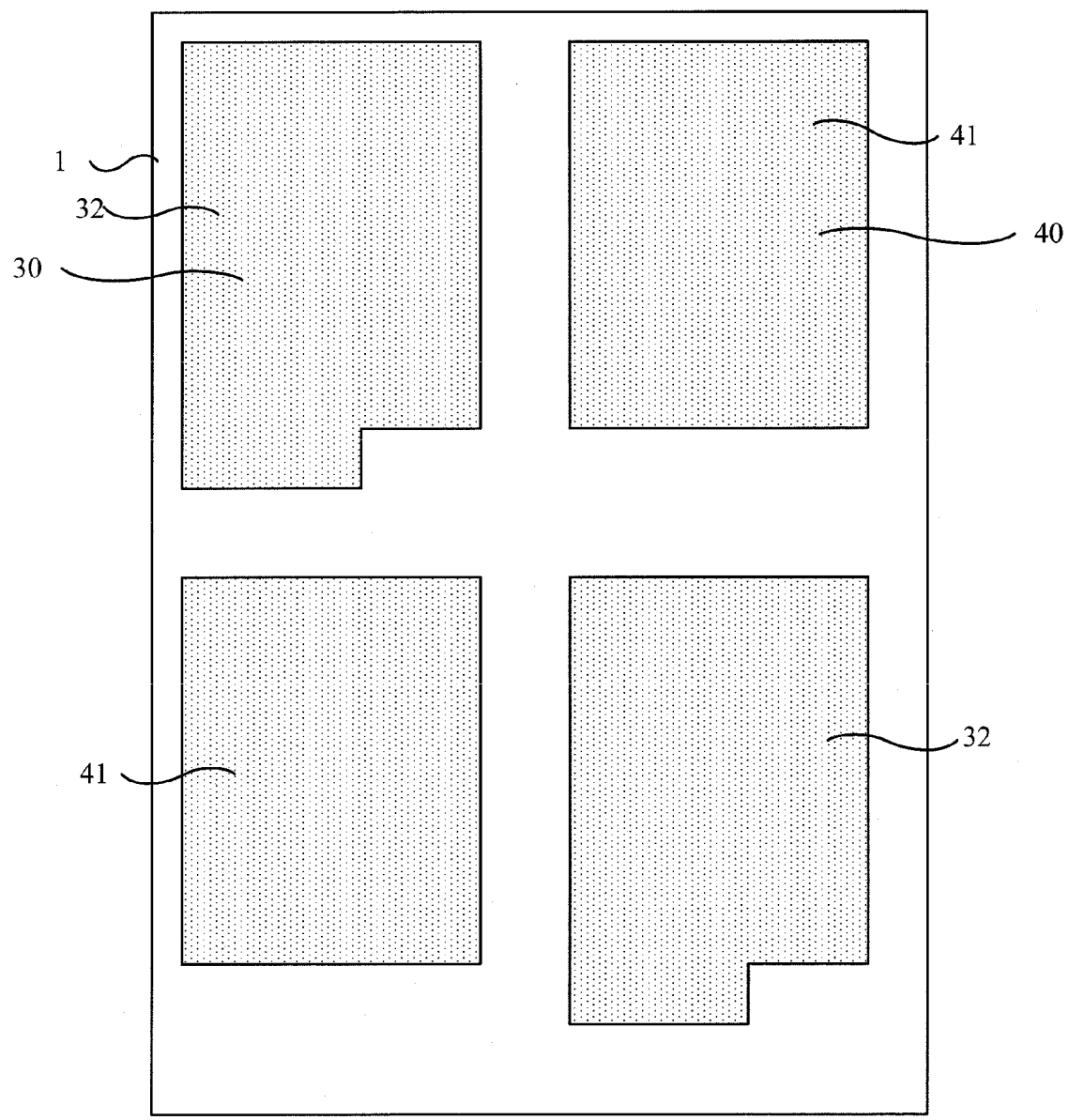
FIG. 2A-2D are top views showing the respective layers of the array substrate according to the first embodiment of the invention.

Firstly, a transparent conductive film is deposited on the base substrate 1 and patterned by a patterning process, so that the first common electrode 32 in each first pixel unit 30 and the second pixel electrode 41 in each second pixel unit are formed on the surface of the base substrate 1, as shown in FIG. 2A.

The patterning process includes any process for patterning a film layer. A typical patterning process comprises applying photoresist layer, exposing the photoresist layer with a photoresist mask and developing, etching the film layer and removing the remaining photoresist and the like.

Figure 2B:
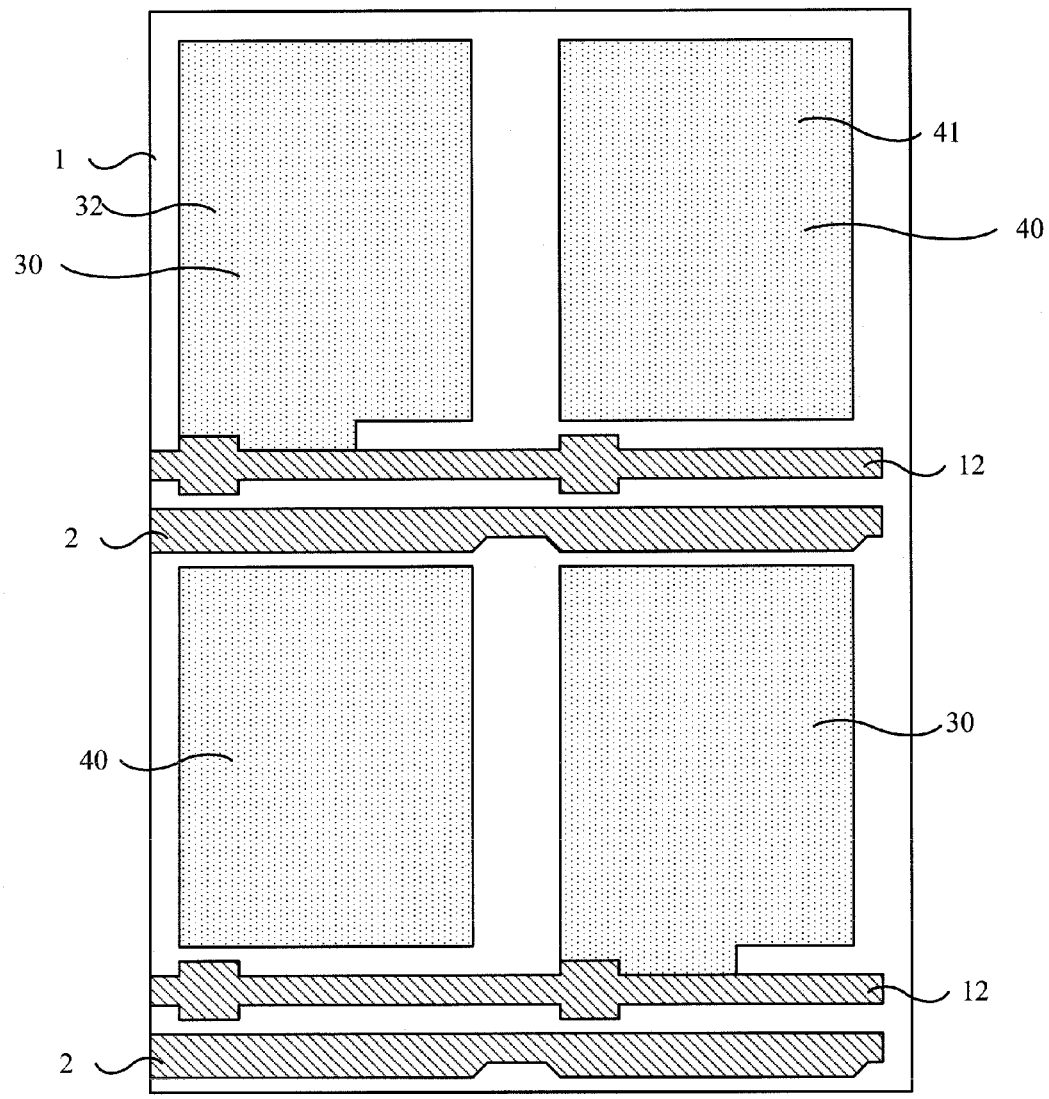

Next, a conductive film is formed on the base substrate 1 with the above pattern and patterned, so that the gate lines 2, the common electrode lines 12 and the gate electrode of the switching element in each pixel unit are formed in the same layer and the first common electrode 32 of each first pixel unit 30 is connected with one common electrode line 12, as shown in FIG. 2B. The gate electrode of each pixel unit is integrally formed with the corresponding gate line 2, and the portion of the gate line 2 that is provided below the active layer island to be formed later works as the gate electrode. The common electrode lines 12 and the gate lines 2 are simultaneously formed by the same conductive material. The conductive material may be a material with appropriate conductivity, such as a metal material. The metal used here may be a single layer or multiple layers of Al, Mo, Cu or any alloy thereof. The common electrode lines 12 are parallel to the gate lines 2 and insulated from each other by a given gap. Moreover, the common electrode lines 12, the gate lines 2, the above-described second pixel electrodes 41 and first common electrodes 32 can be formed in one patterning process with a dual-tone mask.

Figure 2C:
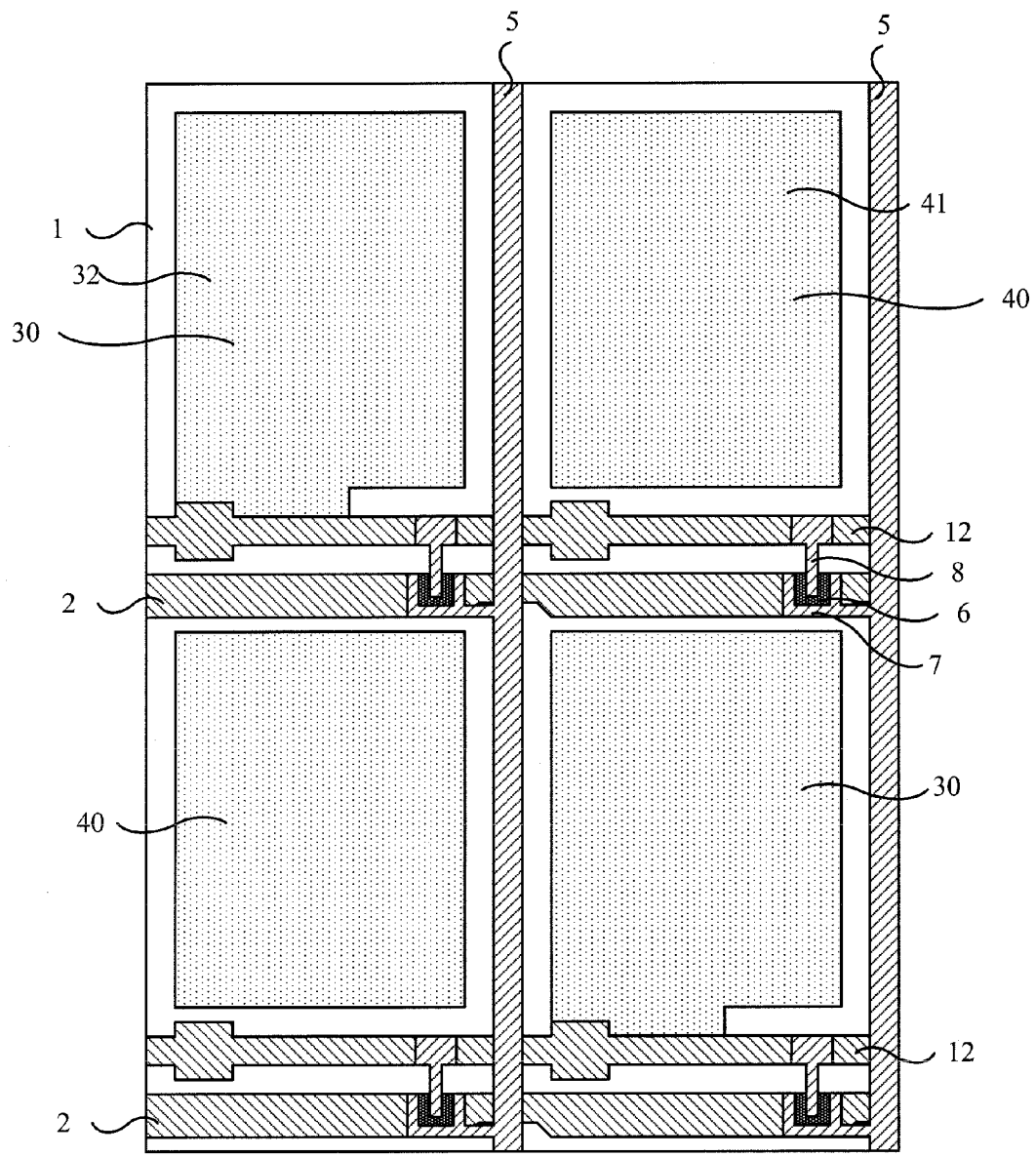

Next, a gate insulating layer (not shown) is formed on the base substrate formed with the first common electrodes 32 of the first pixel units 30, the second pixel electrodes 41 of the second pixel units 40, the gate lines 2, the gate electrodes and the common electrode lines 12. Then, the data lines 5, the active layer islands 6, the source electrodes 7 and the drain electrodes 8 of the switching elements are formed on the gate insulating layer. In addition, the gate insulating layer, the active layer film and the conductive film are sequentially deposited, so that the data lines 5, the source electrodes 7, the drain electrodes 8 and the active layer islands 6 are formed by a patterning process, as shown in FIG. 2C.

Figure 2D:
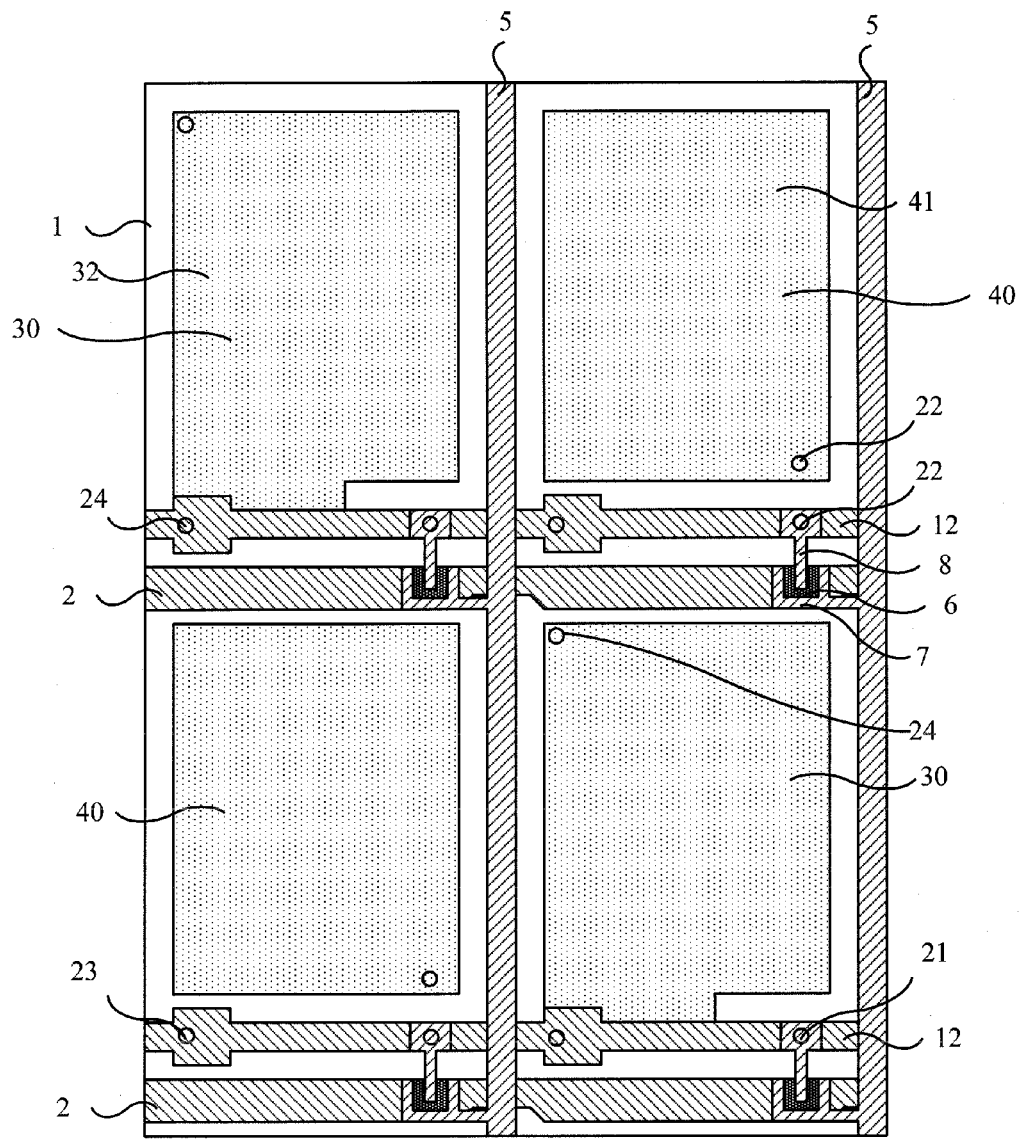

Next, a passivation layer is formed on the base substrate 1 formed with the data lines 5, the active layer islands 6, the source electrodes 7 and the drain electrodes 8. The passivation layer may be formed by an insulating material with high transmissivity such as $SiN_x$ or $SiO_2$. In addition, first insulating layer via holes 21, second insulating layer via holes 22, third insulating layer via holes 23 are formed by a patterning process, as shown in FIG. 2D. The first insulating layer via holes 21 correspond to the drain electrodes 8 of the switching elements of the first pixel units 30, the second insulating layer via holes 22 respectively correspond to the drain electrodes 8 of the switching elements of the second pixel units 40 and the second pixel electrodes 41, and the third insulating layer via holes 23 correspond to the common electrode lines 12 of the second pixel units 40. The respective insulating layer via holes are used to connect conductive structures, and are through holes formed in the passivation layer or formed in the passivation layer and the gate insulating layer.

Finally, the first pixel electrodes 31 of the first pixel units 30 and the second common electrodes 42 of the second pixel units 40 are formed on the passivation layer. The first pixel electrode 31 of each first pixel unit 30 is connected with the drain electrode 8 of the corresponding switching element through the corresponding first insulating via hole 21; the second pixel electrode 41 of each second pixel unit 40 is connected with the drain electrode of the corresponding switching element through the corresponding second insulating via hole and a second bridge line 28, and the second common electrode 42 of each second pixel unit 40 is connected with the corresponding common electrode line 12 through the corresponding third insulating layer via hole 23, as shown in FIG. 1A.

In this embodiment, the common electrodes and the pixel electrodes may be formed by a transparent conductive material such as indium tin oxide (ITO) or indium zinc oxide (IZO). The pixel electrode and the common electrode in each first or second pixel unit are formed by two patterning processes. The bridge lines may be simultaneously formed with the pixel electrodes or common electrodes provided further from the base substrate by using a transparent conductive material. The gate lines, the gate electrodes, the data lines, the source electrodes and the drain electrodes may be formed by materials with appropriate conductivity, such as metal materials, and be formed by two patterning processes. The active layer island may be formed by a semiconductor material, such as α-Si or $N^+Si$, and be simultaneously formed with the drain electrodes and source electrodes. The insulating layer via holes may be formed by a single pattering process after forming of the passivation layer.

Compared with the conventional technology for forming an array substrate, the manufacture process of the array substrate in this embodiment does not increase the number of the patterning processes. The array substrate in this embodiment can be obtained by simply modifying the patterns formed in the respective layers of the conventional array substrate. Therefore, the manufacture process of this embodiment is easily compatible with the conventional technology, and thus the manufacture cost can be reduced.

In addition, preferably, fourth insulating layer via holes 24 are further formed (as shown in FIG. 2D). The fourth insulating layer via holes 24 are respectively correspond to the first common electrodes 32 of the first pixel units 30 and the common electrode lines 12. The common electrode in each pixel unit is connected with the common electrode in the adjacent pixel units in the column direction through the fourth insulating layer via holes 24 and a fourth bridge lines 29, as shown in FIGS. 2D and 1A. In this way, the common electrode in each pixel unit can be connected with the common electrodes in the four adjacent pixel units, so that the common voltage can be distributed throughout the array substrate in a more uniform way.

Figure 1B:
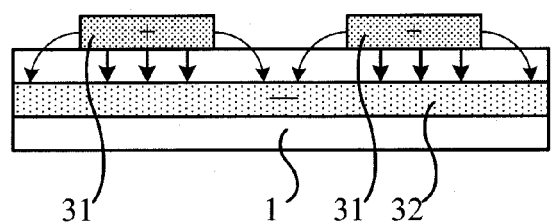
FIG. 1B is a schematic view showing an electric field distribution in a first pixel unit according to the first embodiment of the invention.
Figure 1C:
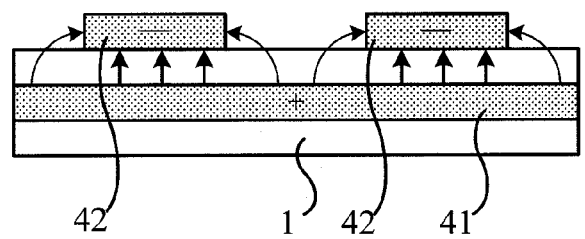
FIG. 1C is a schematic view showing an electric field distribution in a second pixel unit according to the first embodiment of the invention.

In this embodiment, as shown in FIG. 1A, the first pixel units 30 and the second pixel units 40 are alternately provided in both the column and row directions, that is, the pixel units of two types are provided in a point-alternating way. With such a structure, merely by reversely providing the pixel electrodes and the common electrodes in adjacent pixel units, the electric fields in the adjacent pixel units can be reversed without the reverse of the driving signal sequences. The electric field distribution in each first pixel unit 30 when the voltage of the first pixel electrode 31 is larger than the common voltage of the first common electrode 32 is shown in FIG. 1B. The electric field distribution in each second pixel unit 40 when the voltage of the second pixel electrode 41 is larger than the common voltage of the second common electrode 42 is shown in FIG. 1C. As shown in FIGS. 1B and 1C, even when the polarity of voltage difference between the pixel electrode and the common electrode is not reversed in two adjacent pixel units, the electric fields for driving liquid crystal molecules to display at a gray level can have opposite direction in these two adjacent pixel units. Thus, an electric field reverse effect similar to the technology of revering driving signal sequences can be obtained.

According to this embodiment, the electric fields can be reversed between adjacent pixel units without reversing the driving signal sequences, and thus the coupling phenomenon between the electric fields having same polarities can be alleviated by reversing the electric fields, and at the same time the power consumption can be kept at a low level. In this way, display quality can be improved.

Figure 3A:
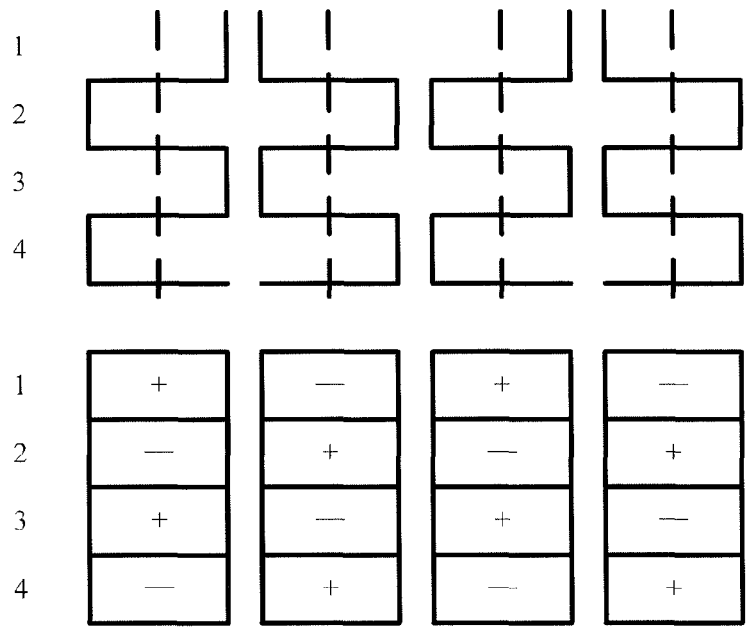
FIG. 3A is a schematic view showing the relationship between the polarity of voltage difference and the electric field polarity of an pixel unit in the conventional technology.
Figure 3B:
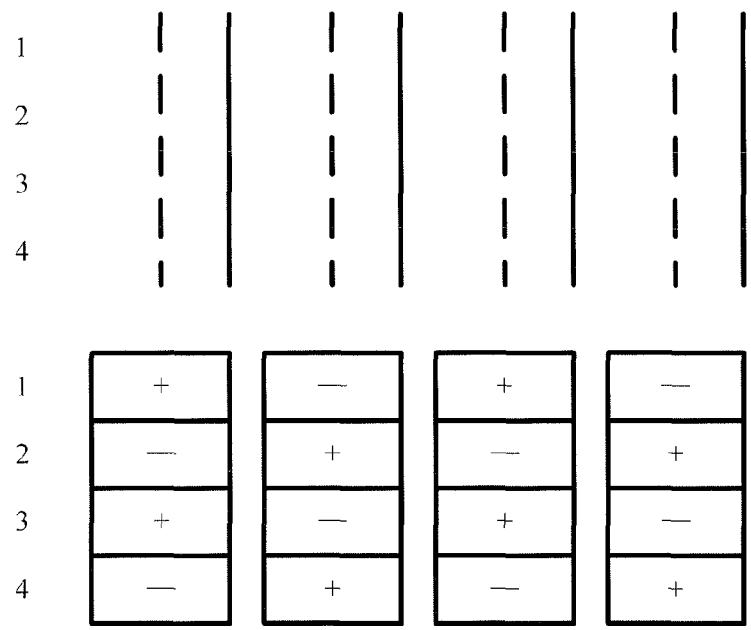
FIGS. 3B and 3C are schematic views showing the relationship between the polarity of voltage difference and the electric field polarity of the pixel unit according to the first embodiment of the invention.
Figures 3C, 4A:
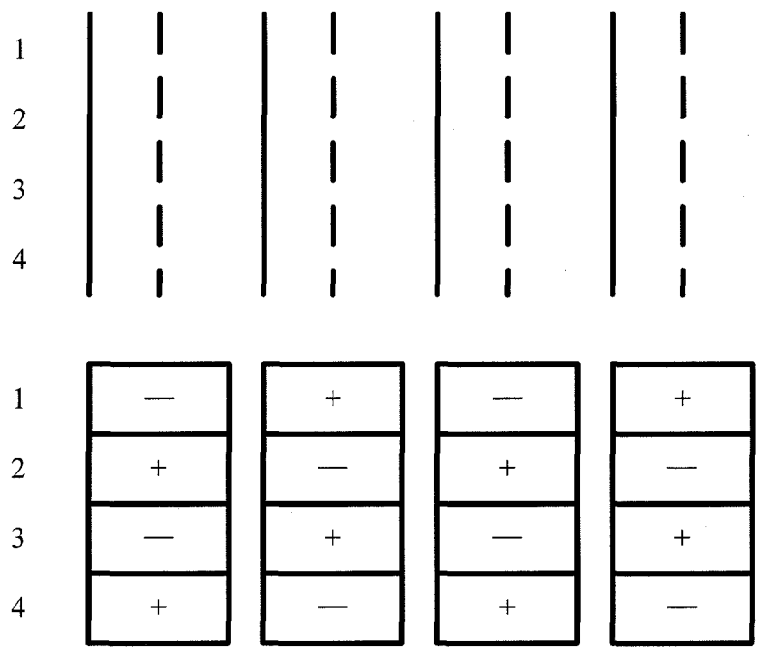
FIG. 4A is a schematic view showing a layout of the array substrate according to the first embodiment of the invention.

In addition, a more important effect realized by this embodiment is that point-reverse of the liquid crystal display device can be achieved by frame-reverse of the driving signal sequences. The term of "point-reverse" refers to the situation in which, in certain pixel unit, the voltage is larger than the common voltage during one frame and the voltage is smaller than the common voltage during the next frame so that the polarity of voltage difference between the pixel electrode and the common electrode is reversed between two adjacent frames; and on the other hand, during the same frames, the direction of the electric field in a pixel unit is opposite to the directions of the electric fields in the adjacent pixel units in the column and row directions. In a conventional technology, in order to achieve point-reverse, the voltages from data lines for driving the respective pixel units are reversed alternatively in one frame. FIG. 3A is a schematic view showing the relationship between the polarities of the voltage and the electric field polarities of pixel units in the conventional technology. In FIG. 3A, the pixel units arranged in 4×4 matrix are shown for example. The signal sequences of the voltages are shown in the upper portion of FIG. 3A, in which the row numbers of the pixel units are indicated along the vertical direction at the leftmost side; in each column of pixel units, the solid line denotes the voltages applied over the data line in this column during line-by-line scanning of one frame, and the dashed line denotes the common voltage applied over the common electrode line in this column. The row numbers can be regarded as the time axis for the voltage signals applied over the data lines and common electrode lines. The electric polarities of the corresponding pixel units are shown in the lower portion of FIG. 3A. As shown in FIG. 3A, in order to achieve point-reverse, the voltage input over one data line is continuously reversed during one frame, and this operation is done in the next frame as well. Therefore, power consumption is increased. On the other hand, according to this embodiment, the voltage input over one data line is kept at the same polarity during a frame, and point-reverse is achieved by the structural design of the pixel units. FIG. 3B shows the relationship between the polarities of the voltage and the electric field polarities of the pixel units in this embodiment. In this embodiment, point-reverse is achieved merely by reversing the voltage per frame. FIG. 3C shows the relationship between the polarities of the voltage and the electric field polarities of the pixel units during the next frame in this embodiment. Therefore, in this embodiment, power consumption can be significantly reduced while point-reverse is achieved. In addition, way to achieve point-reverse of the liquid crystal display by frame-reverse of the driving signals, the delay of the signal from the data line can be decreased, and the charging rate of the pixel can be improved.

When voltages with different polarities are alternately input over the data lines, row-reverse is achieved by employing the structural difference of the pixel units. In addition, both of the first pixel units and the second pixel units can be arranged in a row or column. As shown in FIGS. 4A and 4B, the first pixel unit row/column and the second pixel unit row/column are alternately arranged. In this case, row-reverse or column-reverse can be achieved by employing frame-reverse of the voltage.

By combining the reverse manners of driving signal sequences and the layout of the first pixel units and the second pixel units, various kinds of reverse can be achieved as follows.

By employing column-reverse of driving signal sequences and the point-alternating layout of pixel units, point-reverse or row-reverse is achieved;

By employing row-reverse of driving signal sequences and the point-alternating layout of pixel units, point-reverse or column-reverse is achieved.

The polarities of voltage difference and voltage polarities in the first and second pixel units as shown are interchangeable. In addition, as necessary, two pixel units can be operated as one unit for example, and thus different reverse manner of the pixel units may be further achieved by combining the reverse manner of the driving signal sequences and the layout of the first pixel units and the second pixel units.

In addition, the layer configuration between the pixel electrodes and the data lines, the gate lines and the switching elements and the layer configuration between the common electrodes and the common electrode lines in this embodiment can be adjusted as necessary. For example, in term of aperture ratio, it is preferable to decrease use of bridge lines and increase the opposing area of between the pixel electrode and the common electrode in one pixel unit.

Second Embodiment

Figure 5A:
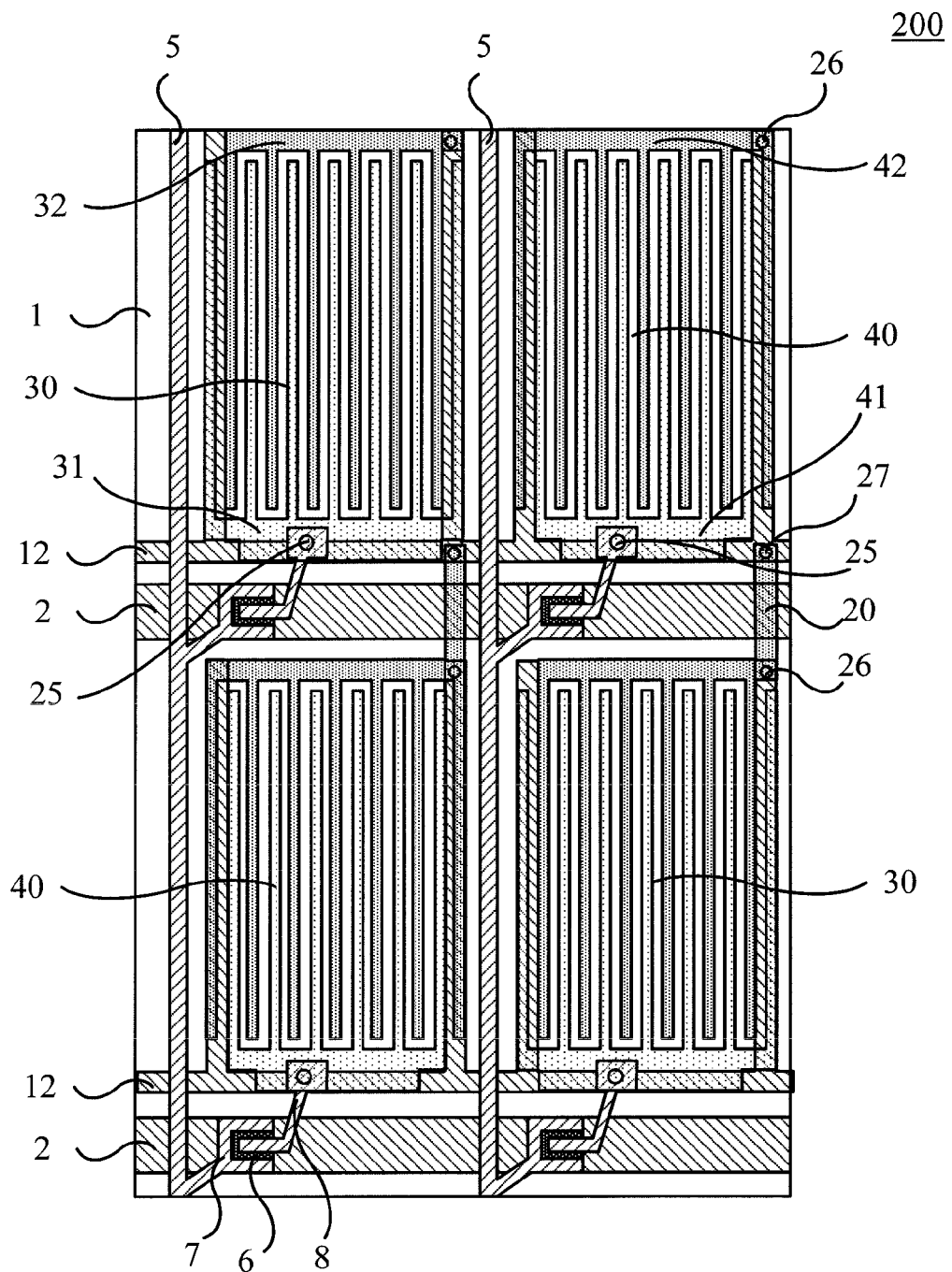
FIG. 5A is a top view showing an array substrate according to a second embodiment of the invention.

FIG. 5A is a top view showing an array substrate according to a second embodiment of the invention. The array substrate 200 comprises a base substrate 1. A plurality of pixel units are provided on the base substrate 1 in a matrix form. In each of the pixel units, a common electrode and a pixel electrode are provided, the common electrode is connected with a common electrode line 12, and the pixel electrode is connected with a gate line 2 and a data line 5 through a switching element. The pixel units in the matrix form comprise first pixel units 30 and second pixel units 40. When the polarity of voltage difference between the pixel electrode and the common electrode in one first pixel unit 30 is identical to that in one second pixel unit 40, the direction of the electric field formed between the pixel electrode and the common electrode and for driving liquid crystal molecules to display at a gray level in the first pixel unit 30 is opposite to that in the second pixel unit 40.

This embodiment relates to an IPS type array substrate. In each of the pixel units, the common electrode and the pixel electrode are provided in the same layer, both the common electrode and the pixel electrode have a comb-like shape, and the common electrode and the pixel electrode are interdigitated with each other. The position of the strips of the first pixel electrode 31 in a comb-like shape in each first pixel unit 30 corresponds to the position of the strips of the second common electrode 42 in a comb-like shape in each second pixel unit 40. The position of the strips of the first common electrode 32 in a comb-like shape in each first pixel unit 30 corresponds to the position of the strips of the second pixel electrode 41 in a comb-like shape in each second pixel unit 40. The strip pattern of the comb-like shape is the main region for forming the horizontal electric field in each pixel unit. The electric field formed by other region of the comb-like shape has little effect on the driving of liquid crystal molecules in each pixel unit, and thus other region of the comb-like shape may be blocked by a black matrix in each pixel unit.

Figure 5B:
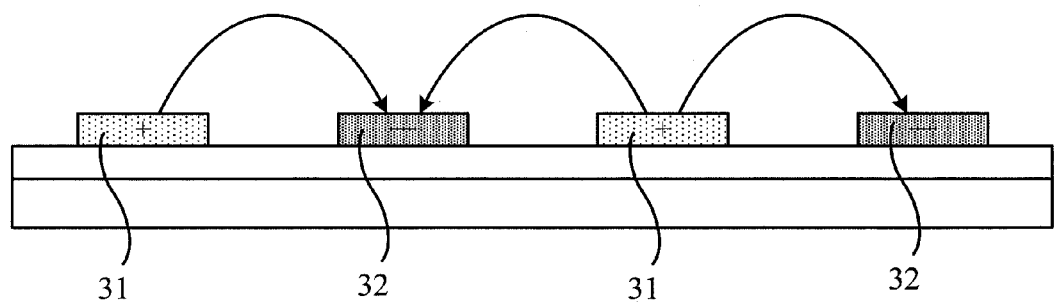
FIG. 5B is a schematic view showing an electric field distribution in a first pixel unit according to the second embodiment of the invention.
Figure 5C:
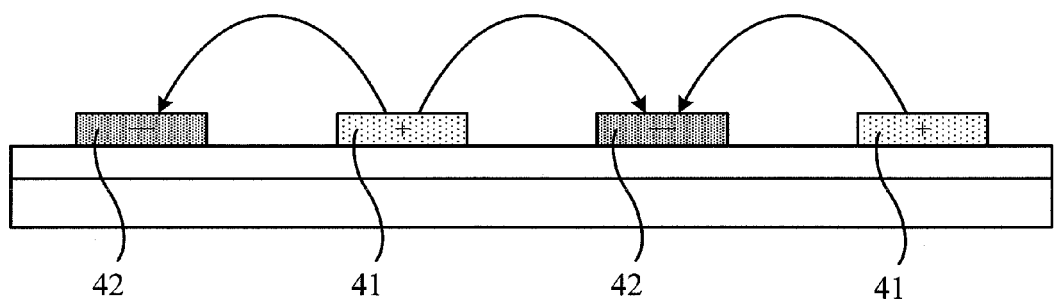
FIG. 5C is a schematic view showing an electric field distribution in a second pixel unit according to the second embodiment of the invention.

In this embodiment, when the voltage applied to the pixel electrode is larger than the common voltage applied to the common electrode, and the electric field distributions of one first pixel unit 30 and one second pixel unit 40 are shown in FIG. 5B and FIG. 5C, respectively.

In this embodiment, the respective layers of the IPS type array substrate 200 are provided as follows.

Figure 6A:
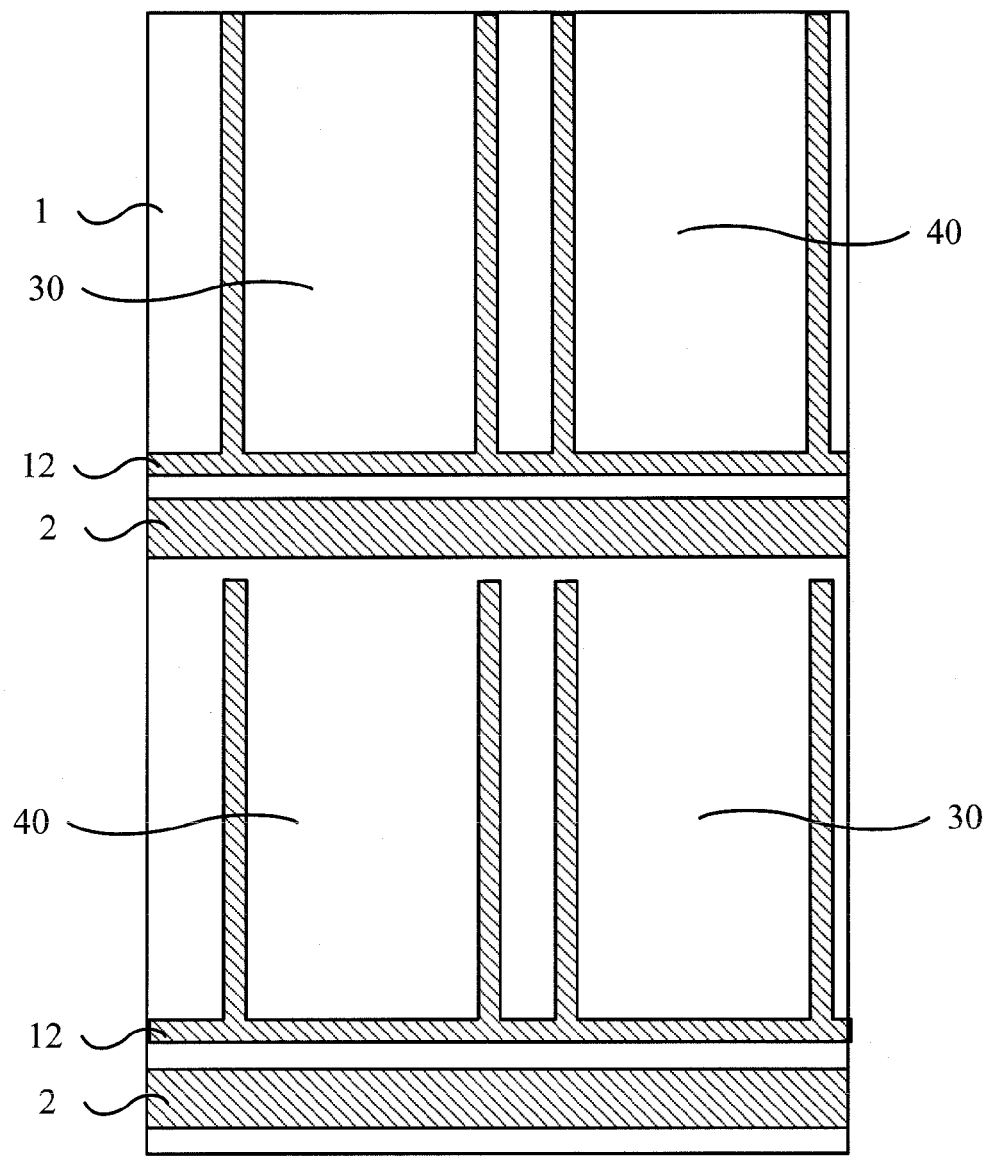
FIG. 6A-6C are top views showing the respective layers of the array substrate according to the second embodiment of the invention.

Firstly, the gate lines 2, the common electrode lines 12 and the gate electrodes of the switch elements are provided on the surface of the base substrate 1 in a same layer, and all can be simultaneously formed in a patterning process, as shown in FIG. 6A. The common electrode lines 12 are provided parallel to the gate lines 2. In addition, each common electrode line 12 further comprises a portion which is overlapped with the pixel electrode of one pixel unit to be formed above later, and thus such portion forms a storage capacitor with the pixel electrode and can block light. The gate electrodes and the gate lines 2 are integrally formed correspondingly, and the portion of each gate line 2 that is provided below the active layer island of one pixel unit to be formed later is used the gate electrode.

Figure 6B:
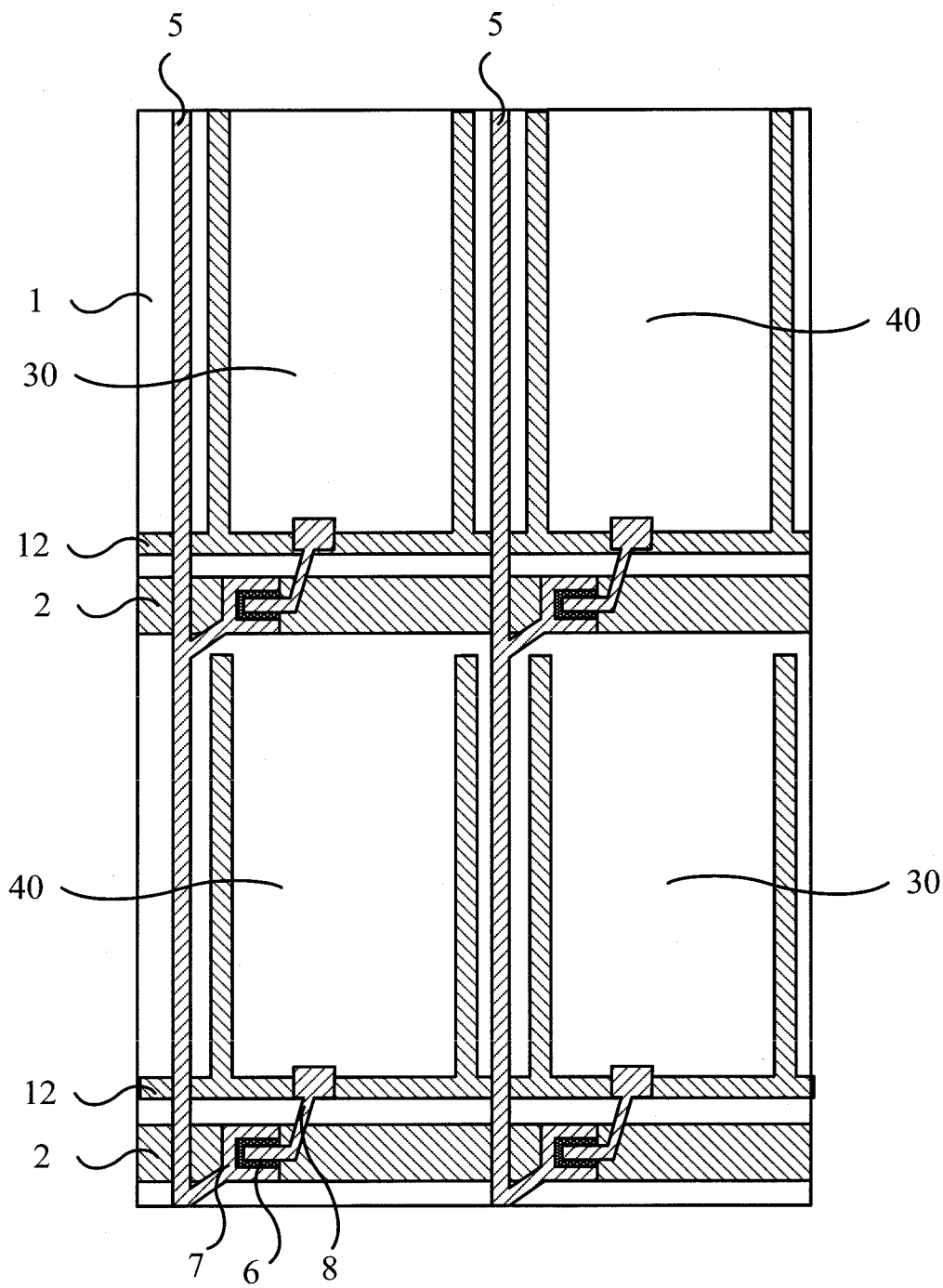

Next, a gate insulating layer (not shown) is applied on the base substrate formed with the gate lines 2, the gate electrodes and the common electrode lines 12. The data lines, the active layer islands 6, the source electrodes 7 and the drain electrodes 8 of the switch elements are formed on the gate insulating layer, as shown in FIG. 6B. The above patterns may be simultaneously formed in a patterning process, and preferably, by a patterning process using a dual-tone mask.

Figure 6C:
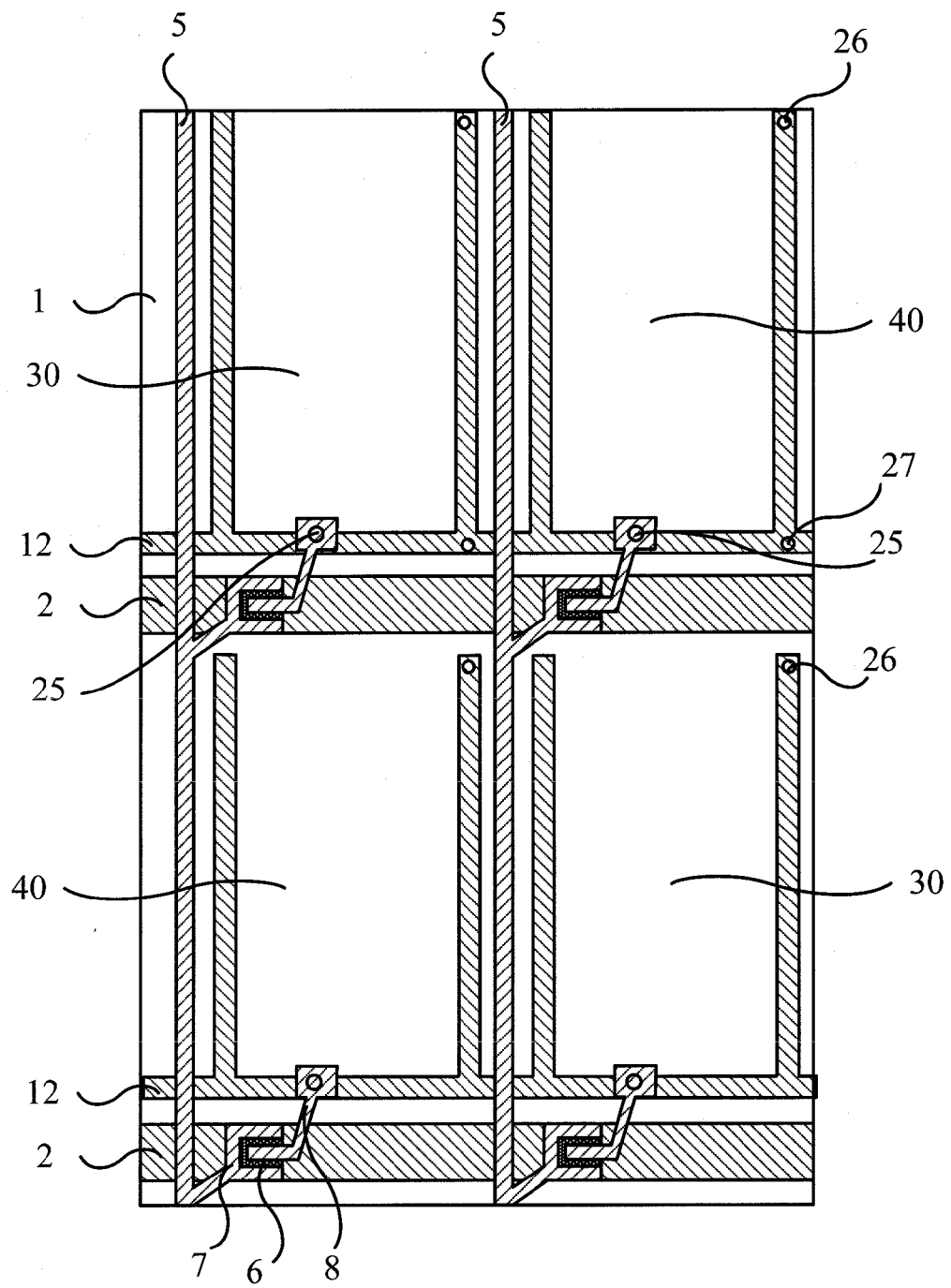

Next, a passivation layer is applied on the base substrate 1 formed with the data lines 5, the active layer islands 6, the source electrodes 7 and the drain electrodes 8. Fifth insulating layer via holes 25 and sixth insulating layer via holes 26 are formed by a patterning process, as shown in FIG. 6C. The fifth insulating layer via holes 25 correspond to the drain electrodes 8 and pass through the passivation layer above the drain electrodes 8. The sixth insulating layer via holes 26 correspond to the common electrode lines 12 and are provided at any positions where the common electrode lines 12 overlap with the respective common electrodes and the pixel electrodes are not disadvantageously influenced. The sixth insulating layer via holes 26 penetrate through the passivation layer and the gate insulating layer above the common electrode lines 12.

Finally, the pixel electrode 31 and the common electrode 41 of each first pixel unit 30 and the pixel electrode 32 and the common electrode 42 of each second pixel unit 40 are formed on the passivation layer, as shown in FIG. 5A. The pixel electrodes in the first pixel units 30 and the pixel electrodes in the second pixel units 40 are respectively connected with the corresponding drain electrodes 8 through the fifth insulating layer via holes 25. The common electrodes in the first pixel units 30 and the common electrodes in the second pixel units 40 are respectively connected with the corresponding common electrode lines 12 through the sixth insulating layer via holes 26. The position of the strips of the first pixel electrode in a comb-like shape in each first pixel unit corresponds to the position of the strips of the second common electrode in a comb-like shape in each second pixel unit, and the position of the strips of the first common electrode in a comb-like shape in each first pixel unit corresponds to the position of the strips of the second pixel electrode in a comb-like shape in each second pixel unit. Thus, when the polarity of voltage difference between the pixel electrode and the common electrode in one first pixel unit is identical to that in one second pixel unit, the direction of the electric field formed in the first pixel unit is opposite to that in the second pixel unit. FIG. 5B is a schematic view showing the electric field distribution in the first pixel unit in this embodiment. FIG. 5C is a schematic view showing the electric field distribution in the second pixel unit in this embodiment. FIGS. 5B and 5C show the case where the voltage of the pixel electrode is larger than the common voltage of the common electrode (that is, the polarity of the voltage is positive) is shown.

In addition, preferably, seventh insulating layer via holes 27 are further formed (as shown in FIG. 6C). The seventh insulating via holes 27 correspond to the common electrode lines in the first pixel units 30 and the common electrode lines in the second pixel units 40, respectively. The common electrode in each pixel unit is connected with the common electrodes in the adjacent pixel units in the column direction through the seventh insulating layer via holes 27 and seventh bridge lines 20, so that the common voltage can be distributed throughout the array substrate in a more uniform way, as shown in FIG. 5A.

In FIG. 5A, the openings of the comb-like pattern of the first pixel electrode 31 in the first pixel unit 30 and the openings of the comb-like pattern of the second pixel electrode 41 in the second pixel unit 40 have the same direction, the openings of the comb-like pattern of the first common electrode 32 in the first pixel unit 30 and the openings of the comb-like pattern of the second common electrode 42 in the second pixel unit 40 have the same direction, the position of the strips of the first pixel electrode in a comb-like shape in the first pixel unit corresponds to the position of the strips of the second common electrode in a comb-like shape in the second pixel unit, and the position of the strips of the first common electrode in a comb-like shape in the first pixel unit corresponds to the position of the strips of the second pixel electrode in a comb-like shape in the second pixel unit. In this way, the structural modification of the conventional common electrode lines and the data lines can be decreased.

In addition, as for an IPS type array substrate, the opposite arrangement of the pixel electrode and the common electrode do not limited to that shown in FIG. 5A. For example, the openings of the comb-like pattern of the first pixel electrode in the first pixel unit and the openings of the comb-like pattern of the second common electrode in the second pixel unit can have the same direction, and the openings of the comb-like pattern of the first common electrode in the first pixel unit and the openings of the comb-like pattern of the second pixel electrode in the second pixel unit can have the same direction. Then, the electrodes are connected to corresponding conductive structures to receive operation voltage or common voltage by adjusting the positions of the common electrode lines and the switching elements. It works to have the above arrangement of the pixel electrode and the common electrode applied to the strip region where the horizontal electric field for driving the liquid crystal molecules, while the edge portions in the comb-like pattern that are connected with the strips and the root portions of the strips that are connected with the edge portions do not belong the strip region of the above opposite arrangement.

In this embodiment, the first pixel units and the second pixel units are alternately provided in the row and column directions. It should be noted that, both the first pixel units and the second pixel units may be arranged in a row or column, and the first pixel unit row/column and the second pixel unit row/column are alternately arranged. In addition, the first pixel units and the second pixel units may be arranged in other layouts as necessary.

In this embodiment, by designing the structures of the first pixel units and the second pixel units, the directions of the electric field for driving liquid crystal molecules to display at a gray level in one first pixel units is opposite to that in one second pixel units when the polarity of voltage difference between the pixel electrode and the common electrode in the first pixel unit is identical to that in the second pixel unit, and thus the adverse influence by the coupling phenomenon and crosstalk phenomenon on the display quality can be decreased. In addition, by combining the reverse of driving signal sequences and the layouts of the first pixel units and the second pixel units, complex pixel reverse manner can be achieved, and thus power consumption for driving can be decreased.

In addition, according to an embodiment of the invention, a liquid crystal panel is provided. The liquid crystal panel comprises an array substrate provided according to the above first or second embodiment, a color filter substrate, and a liquid crystal layer filled between the array substrate and the color filter substrate. The color filter substrate may comprise a black matrix layer and a color filter resin layer formed on another base substrate. The liquid crystal panel displays with reversed horizontal electric field and wide view-angles.

In addition, according to the embodiment, a liquid crystal panel with reversed vertical electric field is provided, and an example thereof is described.

Third Embodiment

Figure 7A:
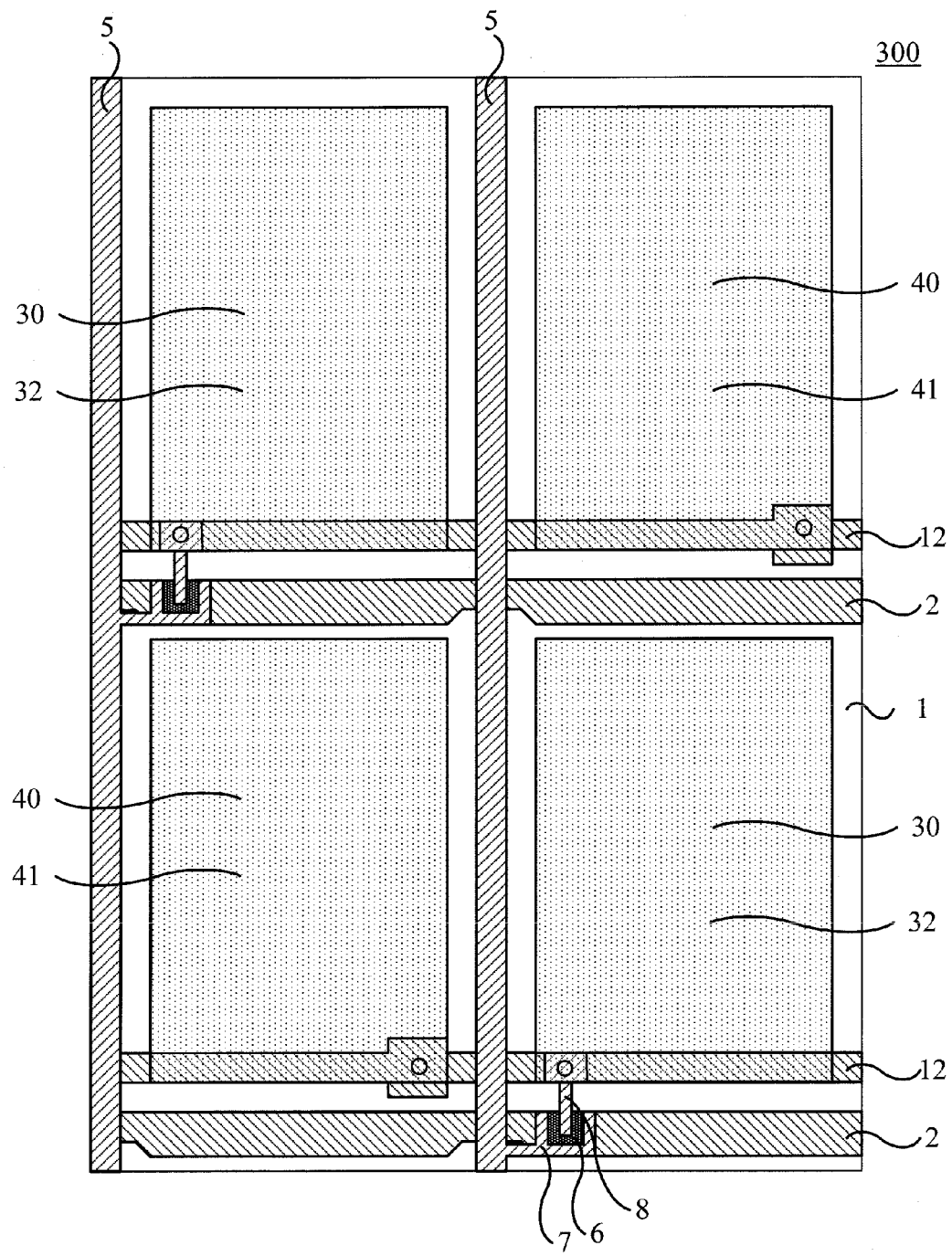
FIG. 7A is a top view showing an array substrate according to a third embodiment of the invention.
Figure 7B:
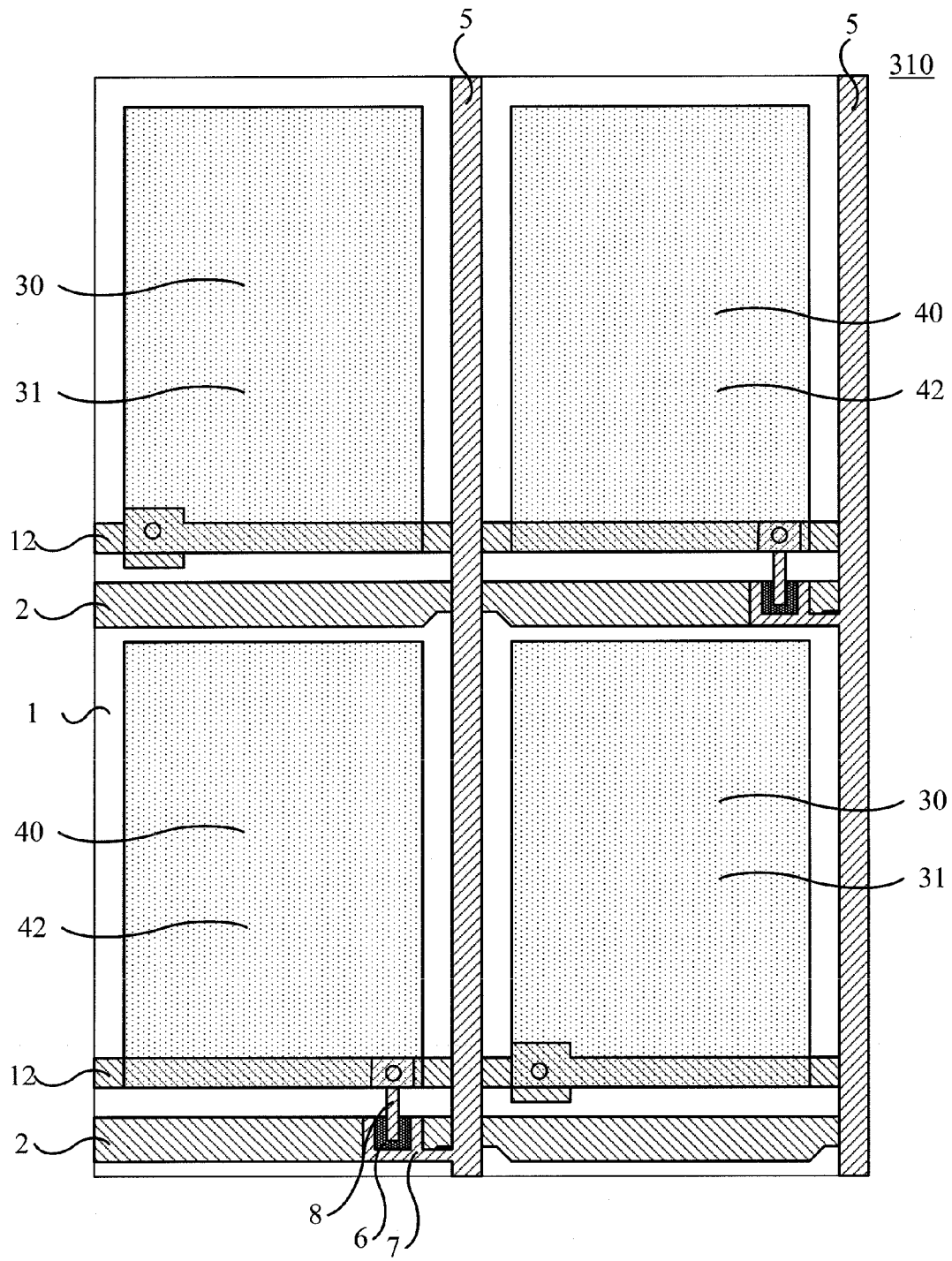
FIG. 7B is a top view showing a color filter substrate according to the third embodiment of the invention.

FIG. 7A is a top view showing an array substrate according to a third embodiment of the invention; and FIG. 7B is a top view showing a color filter substrate according to the third embodiment of the invention. In this embodiment, the liquid crystal panel comprises the array substrate 300 and the color filter substrate 310. A plurality of pixel units are correspondingly formed on both the array substrate 300 and the color filter substrate 310 in a matrix form. In each of the pixel units, a common electrode and a pixel electrode are provided, and the common electrode and the pixel electrode are respectively provided on the array substrate and the color filter substrate; the common electrode is connected with a common electrode line 12, and the pixel electrode is connected with a gate line 2 and a data line 5 through a switching element. The pixel units in the matrix form comprise first pixel units and second pixel units. When the polarity of voltage difference between the pixel electrode and the common electrode in one first pixel unit is identical to that in one second pixel unit, the direction of the electric field formed between the pixel electrode and the common electrode and for driving liquid crystal molecules to display at a gray level in the first pixel unit is opposite to that in the second pixel unit.

The liquid crystal panel in this embodiment relates to a vertical electric field type LCD, such as a TN type LCD. In one first pixel unit 30, the first pixel electrode 31 is provided on the array substrate, and the first common electrode 32 is provided on the color filter substrate. In one second pixel unit 40, the second pixel unit 41 is provided on the color filter substrate, and the second common electrode 42 is provided on the array substrate. Thus, when the polarity of voltage difference between the pixel electrode and the common electrode in one first pixel unit is identical to that in one second pixel unit, the direction of the electric field formed between the pixel electrode and the common electrode and for driving liquid crystal molecules to display at a gray level in the first pixel unit is opposite to that in the second pixel unit.

The array substrate and the color filter substrate in this embodiment can be manufactured by employing the structures in the layer configuration based on conventional ones. Gate lines 2, data lines 5 and common electrode lines 12 are provided on both the array substrate and the color filter substrate, and the pixel unit configuration of the color filter substrate corresponds to that of the array substrate in mirror symmetry. In addition, the color filter substrate further comprises a black matrix layer and a color filter resin layer (not shown). As shown in FIG. 7A, the array substrate 300 comprises data lines 5 and gate lines 2 intersecting with each other. The first pixel electrode 31 of one first pixel unit 30 is connected with a data line through a source electrode 7 of a TFT switching element, and the second common electrode 42 of one second pixel unit 40 is connected with a common electrode line 12. As shown in FIG. 7B, correspondingly on the color filter substrate 310, the second pixel electrode 41 of one second pixel unit is connected with a data line 5 through a source electrode of a TFT switching element, and the first common electrode 32 of one first pixel unit is connected with a common electrode line 12. The common electrode 32 or 42 and the common electrode line 12 may be provided in the same layer to directly connect with each other, or may be provided in different layers to connect with each other through an insulating layer via hole. After assembling the array substrate and the color filter substrate together, the first pixel electrode 31 opposes the first common electrode 32 of the same first pixel unit, and the second pixel electrode 41 opposes the second common electrode 42 of the same second pixel unit 40.

The driving line connected to the data lines is branched into two branch lines, and these two branch lines are respectively connected to the data lines on the array substrate and the data lines on the color filter substrate. Thus, in this embodiment, the electric field in the first pixel units and that in the second pixel units can have opposite directions without reversing driving signal sequences. In this embodiment, the first pixel units and the second pixel units are alternately provided in the row and column directions. Both the first pixel units and the second pixel units may be arranged in a row or column, and the first pixel unit row/column and the second pixel unit row/column are alternately arranged. In addition, in this embodiment, by combining the layout of the first pixel units and the second pixel units and the reverse manner of driving signal sequences, various reverse manners, such as point-reverse, row-reverse or column-reverse, can be achieved.

According to the embodiments of the invention, by designing the structure of pixel units, the reverse of the electric field direction applied across the liquid crystal layer in a LCD panel is achieved. In addition, point-reverse of liquid crystal display can be achieved by employing frame-reverse of driving signal sequences. Thus, the coupling phenomenon can be decreased so that display quality can be improved, and at the same time, power consumption can be decreased.

According to the embodiments of the invention, a liquid crystal display is further provided. The liquid crystal display comprises a casing, a driving device and a liquid crystal panel provided according to any embodiment of the invention. The driving device is connected to the gate lines, the common electrode lines and the data lines of the liquid crystal panel to provide the common voltages to the common electrode lines, the switching voltages for the gate electrode to the gate lines, and the operation voltages to the data lines.

In addition, the layers and patterns of the common electrode lines, the data lines, the gate lines and the switching elements on the array substrate and the color filter substrate are not limited to the above-described embodiments and accompanying drawings, and any structures can be employed in which the common electrode lines apply common voltage to the common electrodes and the gate lines, the data lines and the switching elements cooperate to apply operation voltage to the pixel electrodes in pixel units.

In addition, according to the embodiments of the invention, a driving method for a liquid crystal display is provided. The driving method is used to drive the liquid crystal display provided according to an embodiment of the invention and comprises the step of inputting, over the data lines of the liquid crystal display, voltages of frame-reverse, column-reverse or row-reverse.

When driving signal sequences of row-reverse are inputted, column-reverse or point-reverse can achieved in cooperation with the layout of pixel units. When driving signal sequences of column-reverse are inputted, row-reverse or point-reverse can be achieved in cooperation with the layout of pixel units. When driving signal sequences of frame-reverse are inputted, column-reverse, row-reverse or point-reverse can be achieved in cooperation with the layout of pixel units. Compared with the conventional reverse driving technology, the driving method according to the embodiments of the invention can decrease power consumption and improve display quality.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. An array substrate comprising:
    a base substrate, and
    a plurality of pixel units being provided on the base substrate in a matrix form, a common electrode and a pixel electrode being provided in each of the pixel units, the common electrode being connected with a common electrode line and the pixel electrode being connected with a data line through a switching element, wherein
    the pixel units in the matrix form comprise first pixel units and second pixel units;
    when polarity of voltage difference between the pixel electrode and the common electrode in one first pixel unit is identical to that in one second pixel unit, the direction of an electric field formed between the pixel electrode and the common electrode and for driving liquid crystal molecules to display at a gray level in the first pixel unit is opposite to that in the second pixel unit;
    and wherein the common electrode and the pixel electrode in each pixel unit are provided in a same layer, have a comb-like shape and are interdigitated with each other;
    the position of strips of the pixel electrode in the comb-like shape in each first pixel unit corresponds to the position of strips of the common electrode in the comb-like shape in each second pixel unit; and
    the position of strips of the common electrode in the comb-like shape in the first pixel unit corresponds to the position of strips of the pixel electrode in the comb-like shape in the second pixel unit.

2. The array substrate according to claim 1, wherein
    both the first pixel units and the second pixel units are arranged in a row or column, and the first pixel unit row/column and the second pixel unit row/column are alternately arranged; or
    the first pixel units and the second pixel units are alternately provided in the row and column directions.

3. The array substrate according to claim 1, wherein
    openings of the pixel electrode in the comb-like shape in each first pixel unit and openings of the common electrode in the comb-like shape in each second pixel unit are in a same direction, and openings of the common electrode in the comb-like shape in each first pixel unit and openings of the pixel electrode in the comb-like shape in the second pixel unit are in a same direction; or
    openings of the pixel electrode in the comb-like shape in each first pixel unit and openings of the pixel electrode in the comb-like shape in each second pixel unit are in a same direction, openings of the common electrode in the comb-like shape in each first pixel unit and openings of the common electrode in the comb-like shape in each second pixel unit are in a same direction.

4. The array substrate according to claim 1, wherein
    gate lines, common electrode lines and gate electrodes of the switching element of the pixel units are provided in a same layer on a surface of the base substrate;
    a gate insulating layer is formed on the base substrate formed with the gate lines, the gate electrodes and the common electrode lines;
    data lines, active layer islands, source electrodes and drain electrodes of the switching elements are formed on the gate insulating layer;
    a passivation layer is formed on the base substrate formed with the data lines, the active layer islands, the source electrodes and the drain electrodes;
    the pixel electrode and the common electrode of each first pixel unit and the pixel electrode and the common electrode of each second pixel unit are formed on the passivation layer, the pixel electrodes in the first and second pixel units are respectively connected with the drain electrodes of corresponding switching elements through a fifth insulating layer via hole, the common electrodes in the first and second pixel units are connected with corresponding common electrode lines through a sixth insulating layer via hole.

5. A liquid crystal panel comprising:
    an array substrate further comprising:
    a base substrate, and
    a plurality of pixel units being provided on the base substrate in a matrix form, a common electrode and a pixel electrode being provided in each of the pixel units, the common electrode being connected with a common electrode line and the pixel electrode being connected with a data line through a switching element, wherein
    the pixel units in the matrix form comprise first pixel units and second pixel units;
    when polarity of voltage difference between the pixel electrode and the common electrode in one first pixel unit is identical to that in one second pixel unit, the direction of an electric field formed between the pixel electrode and the common electrode and for driving liquid crystal molecules to display at a gray level in the first pixel unit is opposite to that in the second pixel unit;
    and wherein the common electrode and the pixel electrode in each pixel unit are provided in a same layer, have a comb-like shape and are interdigitated with each other;
    the position of strips of the pixel electrode in the comb-like shape in each first pixel unit corresponds to the position of strips of the common electrode in the comb-like shape in each second pixel unit; and
    the position of strips of the common electrode in the comb-like shape in the first pixel unit corresponds to the position of strips of the pixel electrode in the comb-like shape in the second pixel unit,
    a color filter substrate; and
    a liquid crystal layer filled between the array substrate and the color filter substrate.

* * * * *